United States Patent
Graham et al.

(10) Patent No.: US 7,272,964 B2
(45) Date of Patent: *Sep. 25, 2007

(54) FLUSH MOUNTED LATCH

(75) Inventors: Roderick Graham, Carson, CA (US);
Rodolfo A. Linares, Whittier, CA (US);
George N. Alvarado, Whittier, CA (US)

(73) Assignee: S.P.E.P. Acquisition Corp., Rancho Dominguez, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/386,313

(22) Filed: Mar. 21, 2006

(65) Prior Publication Data

US 2006/0185408 A1    Aug. 24, 2006

Related U.S. Application Data

(60) Division of application No. 10/990,827, filed on Nov. 16, 2004, now Pat. No. 7,013,689, which is a continuation of application No. 10/646,603, filed on Aug. 22, 2003, now abandoned, which is a continuation of application No. 10/037,750, filed on Jan. 2, 2002, now Pat. No. 6,668,602.

(51) Int. Cl.
*E05B 3/00* (2006.01)
*E05B 13/10* (2006.01)

(52) U.S. Cl. .............................. 70/208; 70/207; 70/224; 292/336.3; 292/DIG. 31

(58) Field of Classification Search ................... 70/208, 70/207, 210, 215, 224, 360, 367, 370, 371, 70/375, 489, DIG. 20; 292/336.3, DIG. 31
See application file for complete search history.

(56) References Cited

U.S. PATENT DOCUMENTS

| | | |
|---|---|---|
| 1,995,338 A | 3/1935 | Andrews |
| 2,317,700 A | 4/1943 | Thompson |
| 2,772,809 A | 12/1956 | Ross |
| 3,914,965 A | 10/1975 | Paxton |
| 3,919,866 A | 11/1975 | Lipschutz |
| 4,231,597 A | 11/1980 | Pelcin |

(Continued)

*Primary Examiner*—Carlos Lugo
(74) *Attorney, Agent, or Firm*—Cislo & Thomas LLP; Daniel M. Cislo, Esq.

(57) ABSTRACT

A latch assembly having a latch housing and handle that are substantially or near flush with the surrounding outer surface of the door in which they are mounted when the latch assembly is in its closed position. The latch assembly utilizes a locking cylinder as a push-button mechanism in order to release at least a portion of the handle, which then pivots to an extended position where it can be grasped and turned by an operator. A spindle and latching pawl are slidably connected to the handle and bound by a camming surface in the latch housing so that the spindle and latching pawl moves both axially and rotationally at the same time so that, upon closing, the pawl will cinch down on the frame to create a tight closure between the door and frame.

15 Claims, 4 Drawing Sheets

U.S. PATENT DOCUMENTS

| | | |
|---|---|---|
| 4,510,779 A | 4/1985 | Ahad |
| 4,693,503 A | 9/1987 | Bisbing |
| 4,882,919 A | 11/1989 | Craig |
| D312,769 S | 12/1990 | Bisbing |
| 5,064,228 A | 11/1991 | Bisbing |
| 5,201,557 A | 4/1993 | Schlack |
| D344,881 S | 3/1994 | Sauerland |
| 5,409,272 A | 4/1995 | McCormack |
| 5,440,905 A | 8/1995 | Yamada |
| 5,450,734 A | 9/1995 | Esaki et al. |
| 5,450,735 A | 9/1995 | Esaki et al. |
| 5,452,596 A | 9/1995 | Yamada |
| 5,457,971 A | 10/1995 | Yamada |
| 5,469,725 A | 11/1995 | Yamada |
| 5,556,145 A | 9/1996 | Takasaki |
| 5,570,915 A | 11/1996 | Asadurian |
| 5,638,709 A | 6/1997 | Clavin |
| D396,397 S | 7/1998 | Swan |
| D411,433 S | 6/1999 | Swan et al. |
| D421,209 S | 2/2000 | Buckland |
| 6,039,363 A | 3/2000 | Sugimura et al. |
| 6,174,007 B1 | 1/2001 | Schlack et al. |
| 6,418,761 B1 | 7/2002 | Wytcherley et al. |
| 6,427,501 B2 | 8/2002 | Ramsauer |
| D465,398 S | 11/2002 | Linares et al. |
| 6,606,889 B1 | 8/2003 | Tweedy |
| 6,840,552 B2 | 1/2005 | Ramsauer |

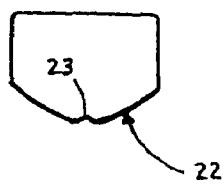
Fig. 5
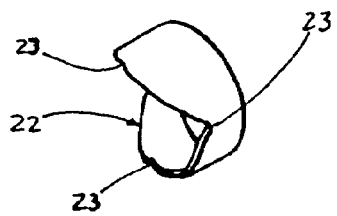
Fig. 4
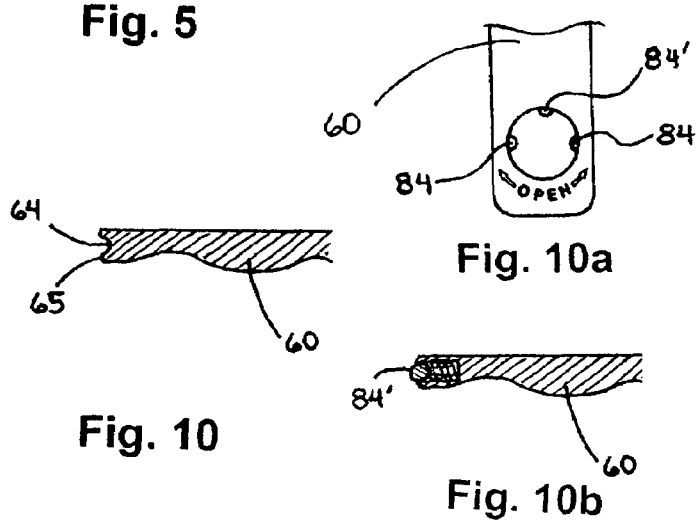
Fig. 10a
Fig. 10
Fig. 10b
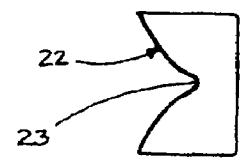
Fig. 6
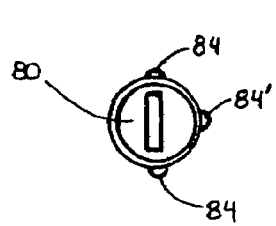
Fig. 8
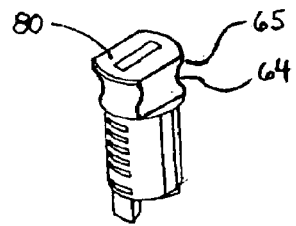
Fig. 7a
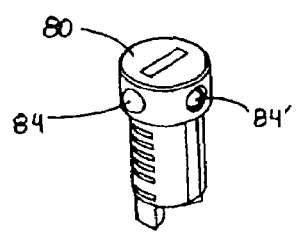
Fig. 7

FLUSH MOUNTED LATCH

CROSS-REFERENCE TO RELATED APPLICATIONS

This utility patent application is a continuation of application Ser. No. 10/990,827 filed Nov. 16, 2004, now U.S. Pat. No. 7,013,689, which is a continuation application of application Ser. No. 10/646,603 filed Aug. 22, 2003, now abandoned, which is a continuation application of application Ser. No. 10/037,750 filed Jan. 2, 2002, now U.S. Pat. No. 6,668,062.

BACKGROUND OF THE INVENTION

This invention relates to latches that are flush or near flush when mounted in a door or frame. Typically, the latch handle is contained with this low profile while not in use, but may be extended in some way to provide access to an operator. Once extended, the handle may be operated to open the door.

One example of such a generally flush mounted latch assembly is U.S. Pat. No. 5,450,735, issued to Takanobu Esaki, et al. of Tokyo, Japan on Sep. 19, 1995. Esaki discloses a pull-out-and-rotate type latch assembly. When locked, the latch handle lies nearly flush with the surrounding housing and door. When unlocked, the handle may be pivoted to an extended position and turned thereby turning a latching plate at the end of a spindle, allowing the door to be opened. Another example of a flush type latch assembly is U.S. Pat. No. 5,457,971, issued to Kenichi Yamada of Tokyo, Japan on Oct. 17, 1995. Yamada discloses a push-button spring-loaded rotary type latch assembly in which a torsion spring urges the handle into an extended position when a push-button is depressed.

In both Esaki and Yamada, the key cylinder is mounted in the handle and the shaft and latching plate can only rotate. Since the key cylinder is mounted in the handle, the length of the handle is dictated in part by how many fingers must fit between the key cylinder and the handle's pivot. Since the latching plate in each does not move axially but only rotates, it does not additionally cinch the door to the frame upon closing. Also, a separate push button mechanism is utilized to release the handle.

What is needed is a push-button type flush mounted latch assembly wherein the push button mechanism is greatly simplified. Additionally, what is needed is such a latch in which the key cylinder may work just as well if mounted in the housing rather than the handle. What is further needed is a latch assembly that causes the latching pawl to both rotate and draw in upon closing so that the door is cinched tightly to the frame.

BRIEF SUMMARY OF THE INVENTION

An object of the present invention is to provide a door latch assembly having a latch housing and handle that are substantially or near flush with the surrounding outer surface of the door in which they are mounted when the latch assembly is in its closed position.

A further object of the present invention is to provide such a latch assembly that utilizes a push-button mechanism in order to release at least a portion of the handle to be pivoted to an extended position and grasped and turned by an operator. Another object of the present invention is to provide such a flush mounted latch in which the push button unit comprises a greatly simplified configuration. Another object of the present invention is to provide such a flush mounted latch in which the locking cylinder itself may operate as the push button for releasing the handle.

It is a further object of the present invention to provide a locking shaft that is slidably connected to the handle so that the locking shaft may move axially as well as rotate at the same time so that a pawl member on the end of the locking shaft may cinch down on the frame to create a tight closure between the door and frame.

These objects are accomplished by the present invention of a latch assembly having a latch housing and handle that are substantially or near flush with the surrounding outer surface of the door in which they are mounted when the latch assembly is in its closed position. The latch assembly utilizes a greatly simplified push-button mechanism in order to release at least a portion of the handle, which then pivots to an extended position and grasped and turned by an operator. A spindle and latching pawl are slidably connected to the handle and bound by a camming surface in the latch housing so that the spindle and latching pawl moves both axially and rotationally at the same time so that, upon closing, the pawl will cinch down on the frame to create a tight closure between the door and frame.

Other aspects and advantages of the present invention will become readily apparent to those skilled in the art from the following detailed descriptions of preferred embodiments when considered in conjunction with accompanying drawings, which illustrate, by way of example, the principles of the invention.

BRIEF DESCRIPTION OF THE DRAWINGS

FIG. 4 is a perspective view of a camming surface of one embodiment of the present invention.

FIG. 5 is a side elevation view of the camming surface of FIG. 4.

FIG. 6 is a top plan view of the camming surface of FIG. 4.

FIG. 7 is a perspective view of a push button unit of one embodiment of the present invention showing two retention members in which one retention member is partially depressed.

FIG. 7a is a perspective view of a push button unit of another embodiment of the present invention as one example of engagement surface 64 and ridge 65 disposed on the push button unit.

FIG. 8 is a top plan view of the push button unit of FIG. 7 in which no retention members are depressed.

FIG. 10 is a cross-section view of a portion of the handle of one embodiment as shown in FIG. 2 taken along the line 10-10 in FIG. 2 showing an engagement surface having a ridge 65.

FIG. 10a is a top view of another embodiment of the present invention as one example of handle retention members 84 and 84' disposed on the handle.

FIG. 10b is a cross-section view of a portion of the handle shown in FIG. 10a showing an example of a depressible handle retention member 84'.

DETAILED DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
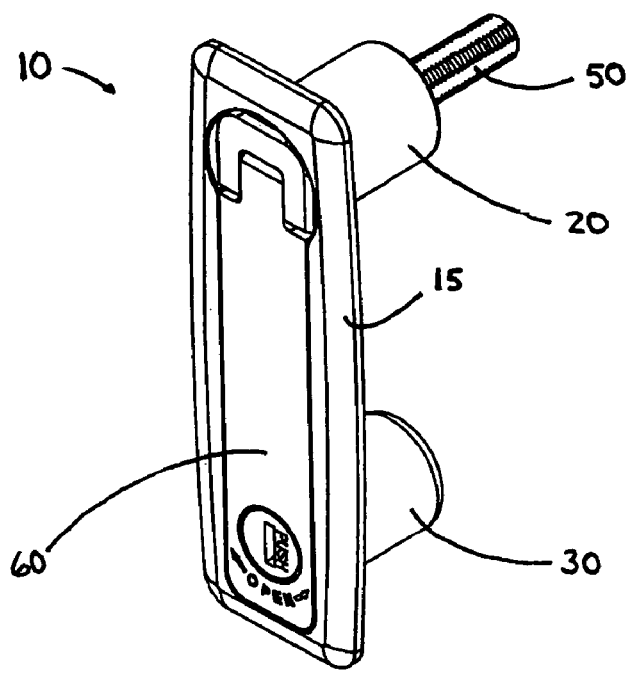
FIG. 1 is a perspective view of one embodiment of the present invention.
Figure 2:
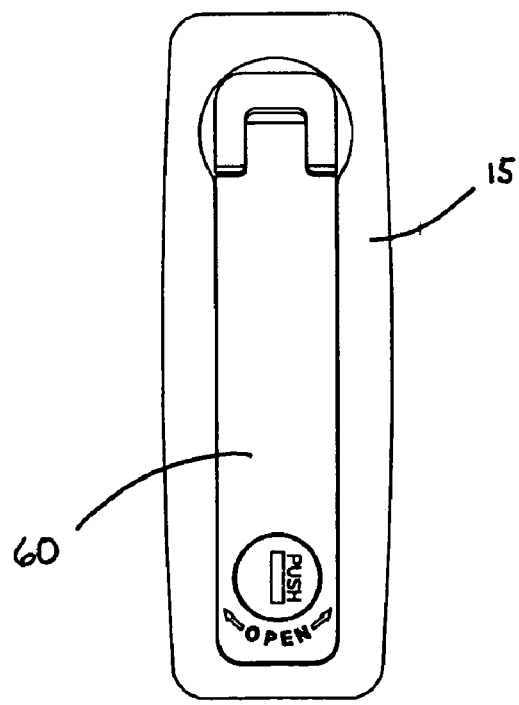
FIG. 2 is a top view of one embodiment of the present invention.

Referring now to the drawings, FIGS. 1 and 2 show one embodiment of the present invention. In particular, this embodiment involves a low profile latch 10, either flush or near flush with the surrounding top surface of the door or panel (not shown) in which the latch 10 is mounted. The latch 10 is comprised of a latch housing 15, handle 60, and locking shaft or spindle 50.

The shaft or spindle 50 would ordinarily have a pawl member 90 mounted to it by any number of standard means. The effect would be that rotation of the shaft 50 would rotate the pawl 90 into a position to cause closure between the door and a mating surface on the surrounding frame or alternatively into a position behind the door so that the door may be opened relative to the surrounding frame. Similarly, axial movement of the shaft 50 causes the pawl 90 to move in the axial direction so that when the shaft 50 is drawn upward toward the latch housing 15, the pawl 90 cinches down on the mating surface of the surrounding frame and create a tight seal between the door and the frame. Additionally, the application may or may not involve a gasket (not shown) between the door and frame. Either way, the rotary and axial movements of the locking shaft 50 are translated to the pawl 90 which is mounted on or fixed to the shaft 50.

Figure 3:
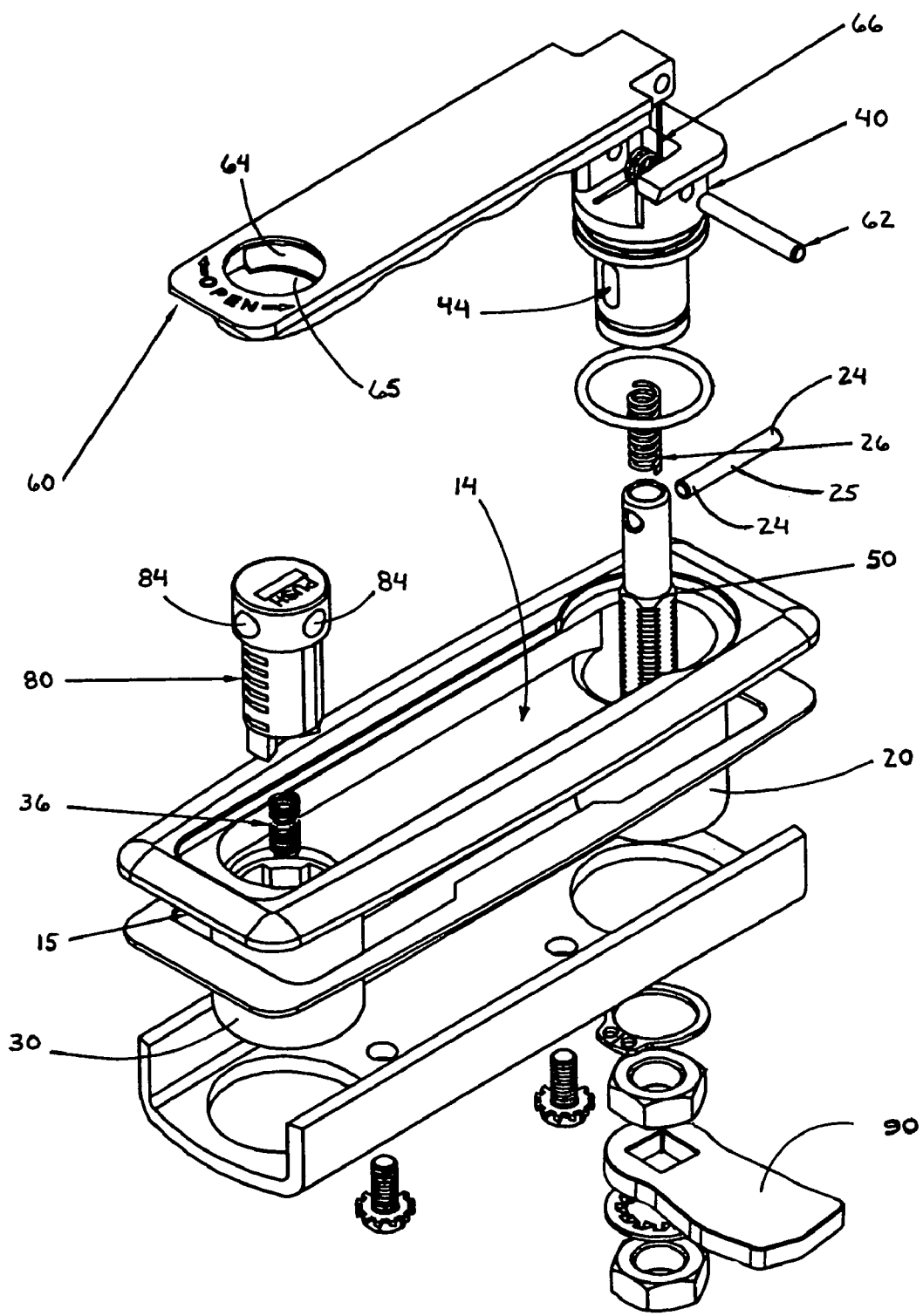
FIG. 3 is an exploded view of the embodiment of FIG. 1.

FIG. 3 illustrates an exploded view of an embodiment of the present invention showing a latch housing 15 comprising a first chamber 20 and a second chamber 30 and a generally longitudinal recess 14 intermediate the two chambers. A plug or retainer unit 40 is rotatably housed in the first chamber 20. On its upper end, the retainer unit 40 has a whole that retains handle pivot 62. On its lower end, the retainer unit 40 has a pair of slots 44 that slidably house follower members 24.

Handle 60 is mounted on pivot 62 and can pivot between a closed and extended position. Torsion spring 66 is positioned between the retainer unit 40 and the handle 60 urging handle 60 toward the extended position. In FIG. 3, the torsion spring 66 is wrapped around pivot 62 of the handle 60, but the handle 60 could be urged toward the extended position by any number of other means, including a compression spring anchored on one end in or by the upper surface of the retainer unit 40, the other end imposing its compressive force on the lower surface of handle 60. Other biasing methods well known in the art may be employed to bias the handle in the extended direction without going beyond the intent of the present invention.

When in the closed position, at least in part of handle 60 rests inside the longitudinal recess 14 of latch housing 15, and is held in place by a push button unit 80. In the embodiment shown in FIG. 3, the surface of push button unit 80 has one or more handle retention members 84 which engage with one or more engagement surfaces 64 of handle 60 to hold handle 60 in the closed position against the urging of biasing means 66. Push button unit 80 is urged upward by a compression spring 36. The force of compression spring 36 may be easily overcome, however, by the operator who presses downward on the top surface of the push button unit 80.

Additionally, the push button unit 80 may optionally also be rotatable. That is, the top surface of push button unit 80 made may be configured with a slot or other depression into which a matching turning tool may be inserted in order to impart a torque to turn the push button unit 80. In such an embodiment, the push button unit 80 may be depressible by the operator only after the push button unit has first been rotated into the proper position. In all other orientations, the push button unit is prevented from being depressed, and the handle 60 will not be released, as discussed below.

As an example, in the embodiment shown in FIGS. 3 and 7 through 9, the push button unit 80 must be rotated first before it may be pushed, and it includes a key cylinder that may be rotated only by inserting a key made to operate the key cylinder. When the key is inserted into the keyhole and turned, the push button unit 80 rotates from a locked position in which it may not be depressed to an unlocked position in which it may be depressed.

The push button unit 80 of FIG. 3, for instance, is prevented from being depressed by the interaction of handle retention members 84 with engagement surface 64. At least one of the handle retention members 84 of FIG. 3 is fixed and may not slide passed ridge 65 of engagement surface 64. When the push button unit 80 is oriented so that this fixed handle retention member 84 is engaged with the engagement surface 64, the push button unit 80 may not be depressed.

Figure 9:
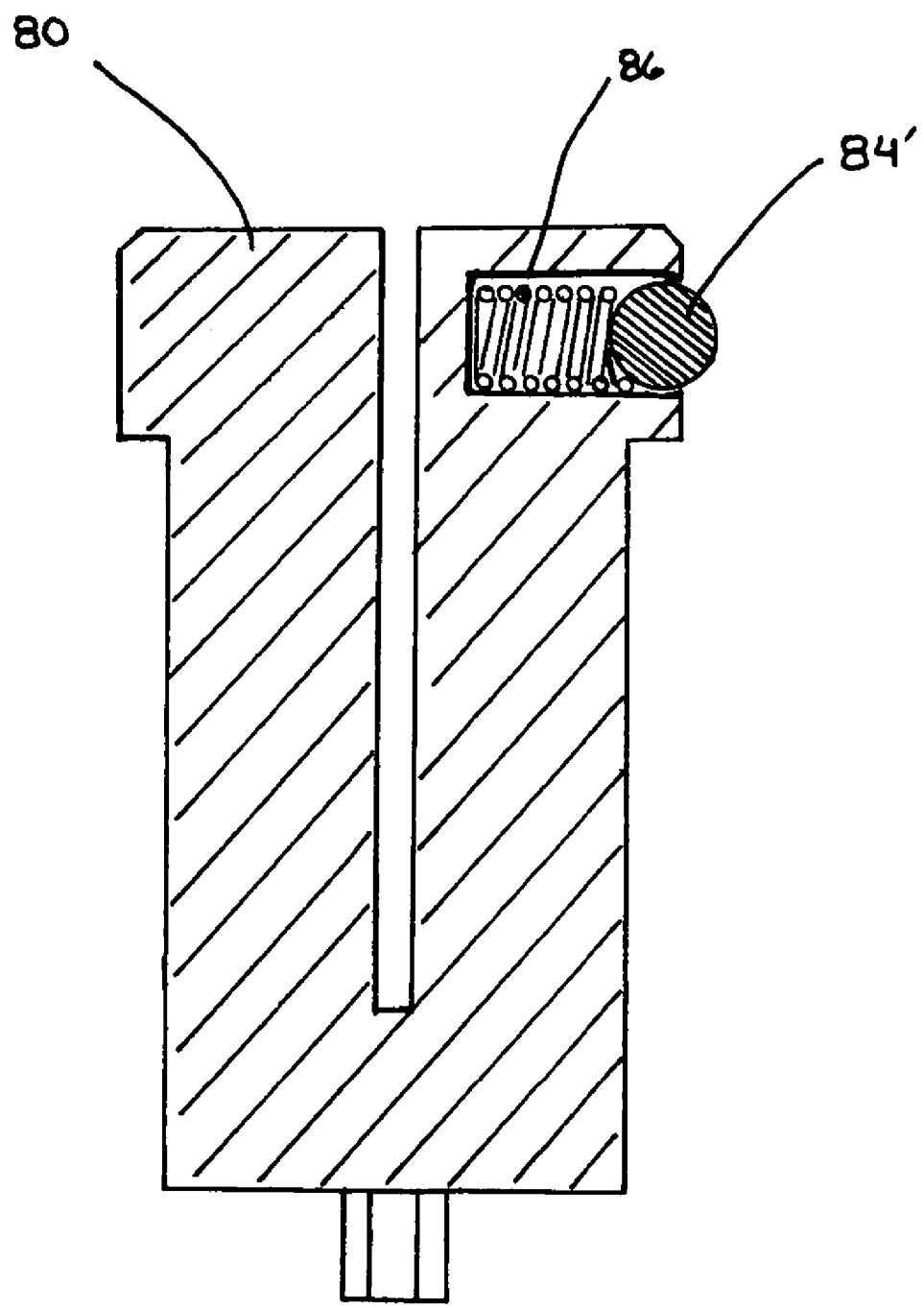
FIG. 9 is a cross-section view taken along the line 9-9 in FIG. 8 showing a depressible retention member not depressed.

As shown in FIGS. 7 and 9, the handle retention members 84 also include at least one depressible handle retention member 84' which may be depressed since it is partially inset in the push button unit 80 and spring-loaded by a compression spring 86 as shown in FIG. 9. As a result of this spring-loaded effect, a sufficient downward force on the top surface of push button unit 80 can cause the depressible handle retention member 84' to encounter a radially inward force from the ridge 65 of engagement surface 64 and thereby be depressed radially inward. As a result, ridge 65 is allowed to pass by the depressible handle retention member 84' and handle 60 is released to spring out to its extended position under the force of torsion spring 66.

In FIG. 3, the handle retention members 84 are located on the surface of the push button unit 80; whereas the engagement surface 64 is located on the handle 60. This configuration, however, could easily be reversed. That is, the fixed handle retention members 84 and depressible handle retention members 84' could be mounted in the handle 60 with the engagement surface 64 and ridge 65 fashioned into the surface of the push button unit 80. In either instance, at certain angular orientations of the push button unit 80, the fixed handle retention members 84 interact with ridge 65 of engagement surface 64 to prevent depression of the push button unit 80, and at another angular orientation or orientations of the push button unit 80, the depressible handle retention members 84' interact with ridge 65 of engagement surface 64 allowing the push button unit 80 to be depressed. The result is that at this latter angular orientation or orientations of push button unit 80, an operator may depress push button unit 80 and thereby release the handle 60 from its closed position.

Once released from its closed position, handle 60 is urged to an extended position where it can be rotated relative to the latch housing 15 thereby rotating the retainer unit 40. A pair of slots 44 are formed through the lower end of retainer unit 40. The slots shown in FIG. 3 are closed at both ends, but a pair of slots that are not closed at one or both ends could work equally as well, provided that the follower members 24 are otherwise bound to a range of motion within the slots. Also, FIG. 3 illustrates a pair of slots 44 formed through a generally hollow retainer unit 40, but if a generally solid retainer unit 40 is employed instead, a single slot could be fashioned through the width of the retainer unit 40, which could function equally as well. Also, a pair of grooves rather than slots could be formed on the inner or outer surfaces of retainer unit 40 to function as slots 44 as described herein.

In either instance, follower members 24 extend into the slots 44 so that the torque on the retainer unit 40 is exerted on follower members 24. Follower members 24 are also connected to shaft 50 so that the torque exerted on follower members 24 is also exerted on shaft 50. As a result, by rotating the handle 60, the operator rotates the shaft 50 and the pawl 90 which is mounted on shaft 50.

Additionally, in one preferred embodiment, a camming surface 22 is either machined, molding, or mounted in the first chamber 20, such as for example being friction pressed into the chamber. In the embodiments shown in FIGS. 4 through 6, the camming surface 22 has a local minimum and a local maximum and an identical pattern on the diametrically opposed camming surface. Follower members 24 are urged up against the camming surface 22 by compression spring 26, which may be positioned in a recess in the retainer unit 40 and forcing shaft 50 away from retainer unit 40. In FIG. 3, for example, an embodiment of the present invention is shown in which the follower members 24 are the central portions of a cross pin 25 on either side of the axis of rotation of the shaft 50, and the opposing ends of the cross pin 25 operate as cam followers. That is, the cross pin 25 is positioned in an orifice at the top end of shaft 50. The cross pin 25 extends through the pair of slots 44 of the retainer unit 40, and the ends of cross pin 25 rest on the camming surface 22, being urged up against camming surface 22 by compression spring 26. Thus, cross pin 25 receives an angular force through retainer unit 40 when an operator turns handle 60, in this embodiment, and rides along camming surface 22, thereby causing shaft 50 to move axially as well as rotate between the latched and unlatched positions.

Alternatively, the shaft 50 could be connected to a second set of cross members, lugs or finger members, one pair extending through the slots 44, and another pair resting on camming surface 22. The embodiment shown in FIG. 3 is a presently preferred embodiment because it involves a simple configuration in which a single cross pin 25 accomplishes both of these functions. This results in relatively simple machining and assembly steps, reduces the number of required parts, and minimizes the exposure of the latch to wear and breakage. Other configurations, however, are equally contemplated by the present invention, including without limitation, using separate cross members in the place of the cross pin 25, or housing the first compression spring 26 in the first chamber 20 rather than retainer unit 40.

In the embodiment shown in FIGS. 4 through 6, a notch 23 is added to the camming surface at each local maximum and each minimum. These notches 23 provide local stable positions for the handle-shaft-and-pawl combination within the range of operation. The notches 23 provide a "snapping" effect that is pleasant to the operator and so that the operator can tell when the pawl and shaft are in the right positions, but the notches are by no means necessary. A camming surface without notches, as well as a camming surface of different shapes and orientations, would be equally effective to impart an axial force on the shaft 50 when follower members 24 are rotated as the result of the operator rotating the handle 60. For example, the camming surface 22 may be shaped so that the path of the pawl can overcome an obstruction on the backside of the door or frame. Also, a notch is not required at the closed position for the additional reason that the handle 60 will be returned to the longitudinal recess 14 and thereby held in place when closed unable to be rotated until push button unit 80 is depressed once again.

While the present invention has been described with regards to particular embodiments, it is recognized that additional variations of the present invention may be devised without departing from the inventive concept.

What is claimed is:

1. A latch assembly comprising:
    a latch housing having first and second chambers and a recessed portion between said first and second chambers,
    a retainer unit at least partially housed in said first chamber,
    a handle pivotally connected to said retainer unit and housed at least partially inside said recessed portion when pivoted to a closed position,
    a push button unit intermediate between said second chamber and said handle,
    a compression spring housed in said second chamber biasing said push button unit in an upward direction,
    means for retaining the handle when the handle is in the closed position, and
    means for disengaging the handle when the push button unit is depressed.

2. A latch assembly according to claim 1 wherein said push button unit rotates.

3. A latch assembly according to claim 1 wherein said means for retaining the handle comprises one or more handle retention members.

4. A latch assembly according to claim 3 wherein said means for disengaging the handle comprises one or more depressible handle retention members.

5. A latch assembly according to claim 1 further comprising a torsion spring between said retainer unit and said handle for urging said handle in an upward direction.

6. A latch assembly comprising:
    a latch housing having first and second chambers and a recessed portion between said first and second chambers,
    a retainer unit at least partially housed in said first chamber,
    a handle pivotally connected to said retainer unit and housed at least partially inside said recessed portion when pivoted to a closed position,
    a push button unit intermediate between said second chamber and said handle, wherein said push button unit passes through said handle,
    a compression spring housed in said second chamber biasing said push button unit in an upward direction,
    means for retaining the handle when the handle is in the closed position, and
    means for disengaging the handle when the push button unit is depressed.

7. A latch assembly according to claim 6 wherein said push button unit rotates.

8. A latch assembly according to claim 6 wherein said means for retaining the handle comprises one or more handle retention members.

9. A latch assembly according to claim 8 wherein said means for disengaging the handle comprises one or more depressible handle retention members.

10. A latch assembly according to claim 6 further comprising a torsion spring between said retainer unit and said handle for urging said handle in an upward direction.

11. A latch assembly comprising:
- a latch housing having first and second chambers and a recessed portion between said first and second chambers,
- a retainer unit at least partially housed in said first chamber,
- a handle pivotally connected to said retainer unit and housed at least partially inside said recessed portion when pivoted to a closed position,
- a push button unit rotatably mounted to said latch housing and intermediate between said second chamber and said handle,
- a compression spring housed in said second chamber biasing said push button unit in an upward direction,
- means for retaining the handle when the handle is in the closed position, and
- means for disengaging the handle when the push button unit is depressed.

12. A latch assembly according to claim 11 wherein said push button unit rotates between a retention position and a disengagement position.

13. A latch assembly according to claim 11 wherein said means for retaining the handle comprises one or more handle retention members.

14. A latch assembly according to claim 13 wherein said means for disengaging the handle comprises one or more depressible handle retention members.

15. A latch assembly according to claim 11 further comprising a torsion spring between said retainer unit and said handle for urging said handle in an upward direction.

* * * * *